Feb. 16, 1926.
D. R. TANNER
MEANS OF ARRESTING A SAWMILL CARRIAGE
Filed March 19, 1921     5 Sheets-Sheet 1

1,573,428

Inventor
Daniel R Tanner
By Carl B Crawford
Attorney

Feb. 16, 1926.

D. R. TANNER

1,573,428

MEANS OF ARRESTING A SAWMILL CARRIAGE

Filed March 19, 1921    5 Sheets-Sheet 2

Inventor
Daniel R Tanner
by
Carl M. Crawford
Attorney

Feb. 16, 1926. 1,573,428
D. R. TANNER
MEANS OF ARRESTING A SAWMILL CARRIAGE
Filed March 19, 1921  5 Sheets-Sheet 4

Patented Feb. 16, 1926.

1,573,428

UNITED STATES PATENT OFFICE.

DANIEL R. TANNER, OF LA GRANDE, OREGON.

MEANS OF ARRESTING A SAWMILL CARRIAGE.

Application filed March 19, 1921. Serial No. 453,658.

*To all whom it may concern:*

Be it known that I, DANIEL R. TANNER, a citizen of the United States, residing at La Grande, in the county of Union and State of Oregon, have invented new and useful Improvements in Means of Arresting a Sawmill Carriage, of which the following is a specification.

This invention relates to improvements in safety or emergency devices for reciprocating saw mill carriages operated by pressure fluid mechanism.

Steam operated carriages involve a main cylinder having a piston connected with the carriage together with devices for alternately admitting and exhausting steam to and from opposite ends of the cylinder to reciprocate the piston therein. Various reasons and causes, all too well known in this art to require explanation, result in what is known as a "run-away" carriage. A carriage may either run away or it may jam its abutments, in either of which event great damage to equipment and life will result by reason of the fact that no safety device, as far as I am aware, has been devised which would enable the carriage lever man or operator to quickly bring the carriage to a position of rest. Merely shutting off the steam or other pressure medium is not sufficient as the carriage is of great weight and because of its speed of operation, its momentum alone would cause the carriage to inflict great injury.

Now it is the object of this invention to provide improved means in easy access to the carriage lever operator whereby the latter may instantly employ or divert for emergency utility, the very same steam or pressure fluid to stop the carriage that is ordinarily or normally used to reciprocate the same, and at any position of the carriage either at, or between its extreme terminals of reciprocating movement.

In accordance with my invention the normally acting valves or devices which control the flow of steam for operating the carriage need not be in any way adjusted in order to make an emergency application of the steam as these devices are instantly rendered inactive, irrespective of their position, immediately upon an emergency application of the steam to stop the carriage. Therefore this feature of my invention greatly increases the facility with which a serious accident may be avoided.

By means of my improved invention, the carriage may not only be brought to a position of rest irrespective of the position of the carriage when the emergency steam has been applied, but in addition, the carriage is arrested by such a relatively gentle cushioning action as to thereby greatly reduce the element of danger in bringing the carriage to a position of rest.

It is a further feature of this invention to provide means for restoring the parts from an emergency to a normal operating position of adjustment, such means being at a point remote from the carriage operator thereby preventing the latter from again starting the carriage prior to proper warning of all of the operators. In other words, my invention provides for rendering the carriage operating mechanism completely inoperative until said mechanism has been definitely restored to an operative adjustment wholly independently of the carriage lever man.

A further and very important feature of this invention resides in an improved lever mechanism for the carriage man which is in the form of a combined normal and emergency lever structure which is so constructed and arranged that the lever man may initiate an emergency steam application without removing his hand from the lever, and further, he may make such emergency application in precisely the same direction of thrust which he ordinarily applies to the lever during normal operation of the carriage, the only difference being that this thrust on the lever must be an abnormal thrust of either a pull or push nature in excess of the usual thrust which he applies in normal operation. Thus it will be seen that this feature of the invention takes advantage of the fact that even a skilled carriage man will become excited in such an emergency as a run away and thus his natural inclination will be to do that very thing which an urgent situation calls for, viz to apply an abnormal pulling or pushing thrust on the main control lever and thereby initiate an emergency steam application.

It is a further feature of my invention to incorporate in the usual steam operated mechanism an energized trip device which at all times seeks and is energized for the purpose of operation but which is normally restrained therefrom so that when said device is released for action it will instantly respond to requirements.

My invention has many other features and objects which will be more fully understood in connection with the description of the accompanying drawings and will be more particularly pointed out in and by the appended claims.

In the drawings:

Figure 2 is a plan view thereof.

Figure 3 is a view of a portion of the pipe line structure looking from the left of Figure 2.

Like characters of reference designate similar parts throughout the different figures of the drawings.

As shown, 1 designates what I will term the carriage floor on which the carriage 2 is reciprocated, the carriage being merely generally indicated. A main cylinder 3 is provided with a piston 4, the latter having a piston rod 5 which may be coupled to the carriage 2, in any desired manner as generally indicated at 6. In operation, steam or other pressure fluid is alternately admitted to and exhausted from opposite ends of cylinder 3 to reciprocate the piston 4 therein, the stroke of the piston 4 being equal to the length of the run of the carriage. Pipe lines 7 and 8 lead to opposite ends of the cylinder 3 and are shown extending downwardly subjacent therefrom. These pipe lines have horizontal rearwardly extending sections 9 and 10 which are coupled to a connecting pipe line 11 having a feed connection 12 which may be provided with a shutoff valve 13. Sections 9 and 10 are provided with valves 14 and 15 for controlling admission and exhaust of steam to and from the cylinder 3 and which will hereinafter be termed the main or normal devices or valves by reason of the fact that they function during normal operation of the carriage. These valves are more clearly shown in Figures 4 and 5, to which reference will be made in describing their operation.

Figures 1, 11, 12:
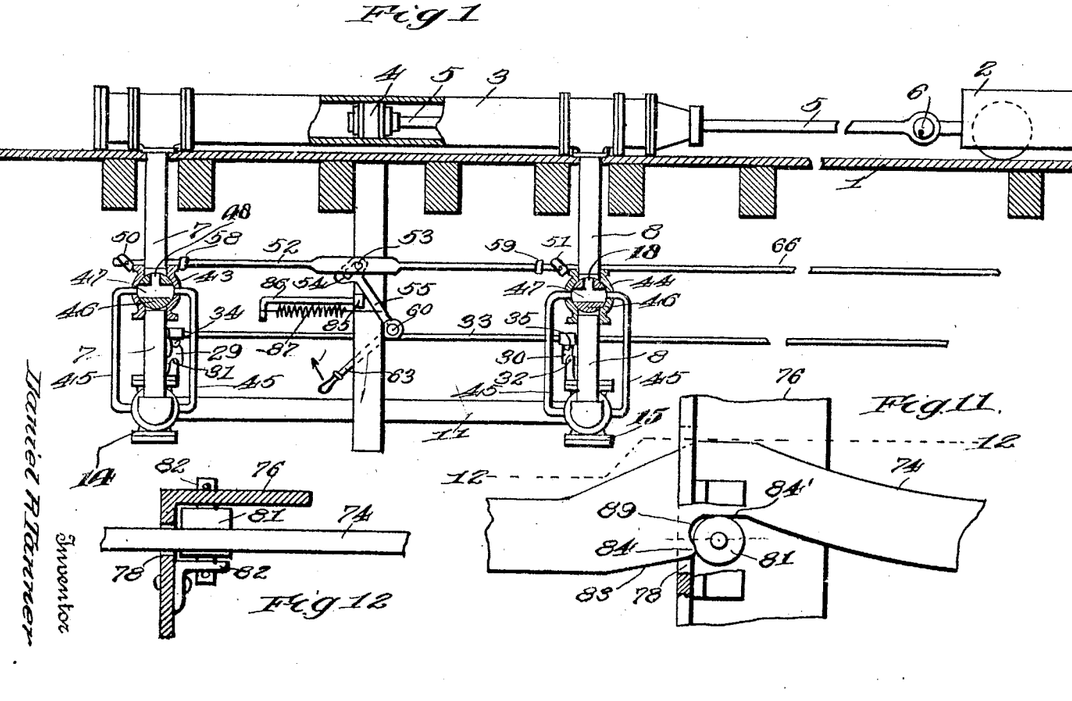
Figure 1 is a view in side elevation partly in section of a portion of a mill structure showing the device of my invention applied thereto.
Figure 11 is an enlarged view of that portion of the trip bar showing that part thereof which engages the retaining roller.
Figure 12 is a sectional view on line 12—12 of Figure 11.
Figures 8, 9:
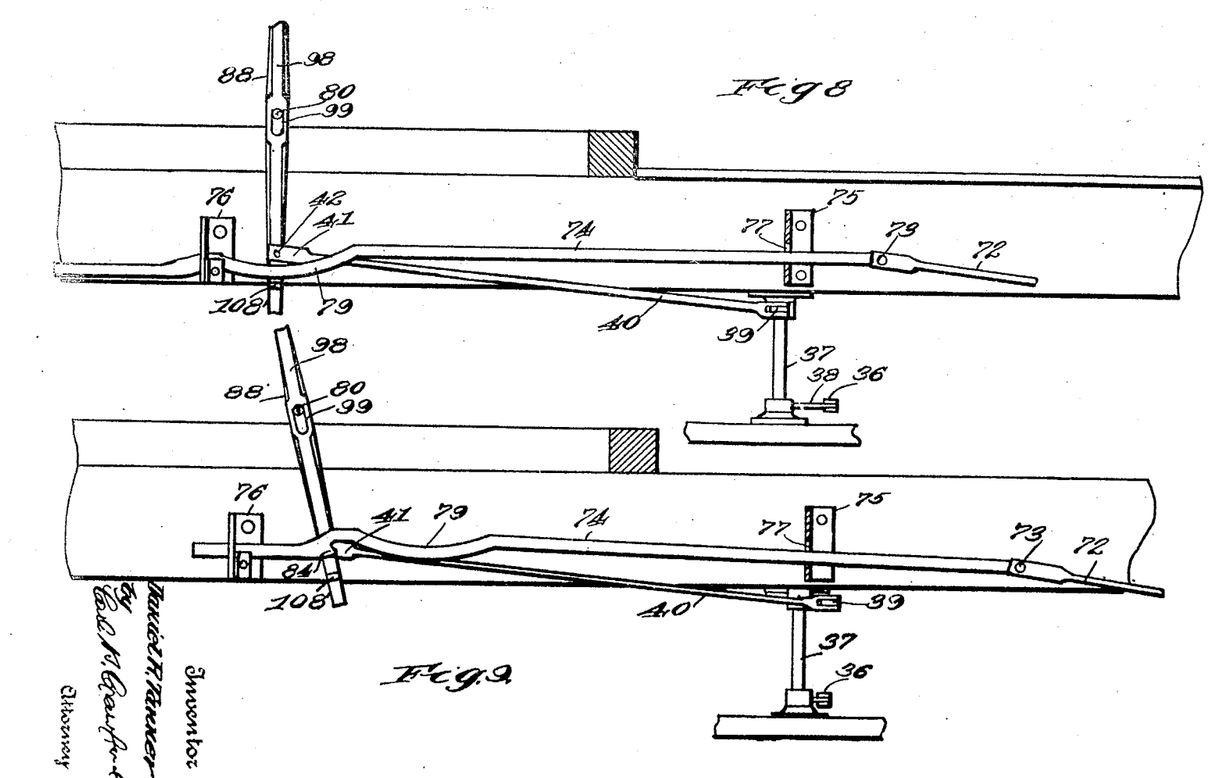
Figure 8 is a view of the controlling lever and a portion of the trip device showing the parts in a normal position of adjustment for the usual operation of the carriage.

It will be noted that in these two figures the main valves 14 and 15 are turned ninety degrees from their correct position shown in Figures 1 to 3, this alteration of position being for the purpose of more clearly illustrating the internal structure of the valves. As will be noted, these valves are of the piston or plunger type and as all are the same in operation and structure, only one need be described in detail. The valve casing 14 has a cylindrical bore 16 in which the piston closure operates, the bore being divided into two sections, the lower section being indicated at 17. A part of the casing extends downwardly and upwardly in the valve, as indicated at 18 and 19 and the valve is provided with an intake portion 20 delivering to an intake opening 21 which intersects the cylindrical bore, the latter having an annular groove 22 registering with intake 21. The casing is interrupted at 23 to provide ingress of steam in the direction indicated by the arrow. Exhaust is afforded from section 17. The closure is provided with piston portions 24 and 25 which fit tightly in sections 16 and 17. Said closure is also provided with an annularly recessed intermediate portion 26. In the position shown in Figure 4, steam is cut off by portion 25 and the valve is in the exhaust adjustment whereby steam may be exhausted as indicated by the arrow. The right hand valve is in a steam intake position. In Figure 5, the closure of the left hand valve is in a steam admission adjustment whereby exhaust is cut off and whereby steam may pass through the valve as shown by the arrow. The right hand valve is in an exhaust position. The valve closures have stems, one being shown at 27. Rocking bell crank levers 29 and 30 are connected with said closures and are pivoted at 31 and 32. An operating rod 33 has connection with said levers 29 and 30 at 34 and 35 so that when the rod is shifted to the left of Figure 1 one closure will be in a steam admission adjustment and the other in an exhaust adjustment as shown in Figure 5 whereas in the position of the rod in Figure 1, the closures will be in the intake and exhaust adjustments shown in Figure 4. Rod 33 is connected at 36 with a bell crank lever which is pivoted or which turns about a fixed axis shown at 37. The remaining arm 38 is connected at 39 with a link 40, as shown in Figures 2 and 8. The remaining end of the link rod 40 is forked at 41 and a pin 42 connects said rod with the controlling lever which will be later described.

All of the foregoing is a well known structure in common use but it is necessary to illustrate and describe the same in order that my improvement may be understood. In operation, to and fro movement of the controlling lever and rod 33 will alternately open valves 14 and 15 to admission and exhaust of steam to and from the ends of cylinder 3.

This equipment is known as the "double steam feed valve system", one valve (14) for each end of the cylinder, in contra-distinction to the "single feed valve system" as shown for instance in the U. S. patent to Wilkin, issued Nov. 26, 1907, No. 872,038.

I will next describe that portion of the apparatus which constitutes my invention. Interposed in pipe lines 7 and 8, (Figs. 4, 6 and 7) in following relation with respect to the main valves, as regards the flow of steam, are emergency valves 43 and 44. These valves are alike both in structure and function and therefore only one need be described in detail. By-pass pipes 45 connect the main valve 14 with the emergency valve 43. The emergency valve has an oscillatory valve closure 46 having a normal and relatively enlarged port 47 and two relatively small emergency ports 48 leading radially from intersecting relation with the main port 47. It will be seen that the pipes 45 enter the valve 43 centrally thereof, so that ports 48 are never in registry with said pipes. In the position shown in Figures 5 and 7, the closures of the emergency valves are in the position which they would assume when the carriage is in normal operation. In other words, the ports 47 permit of free passage of the steam upwardly in pipe lines 7 and 8 through the emergency valves. The ports 48 are off center from and out of registry with pipes 45, or rather the upper terminals thereof, and while pipes 45 are full of steam under pressure and ready for entrance, the steam cannot enter the emergency valve. In the position shown in Figures 4 and 6, the imperforate portions of the closures 46 close upward travel of the steam at the bottom of the emergency valve. The port 47 is in full registry with both of the upper ends of pipes 45 and the ports 48 are in full registry with pipe lines 7 and 8 for upward travel of the steam simultaneously to both ends of the cylinder 3. Therefore, irrespective of the position which piston 4 may occupy, it will almost instantly be subjected to an equilibrium of pressure on both ends thereof. This pressure as is usual with steam, will not bring the piston and carriage to an abrupt stop, the steam pressure for operating the carriage not being sufficiently high to render such defective action, on the contrary, when the valves are turned into this emergency adjustment, the steam will simultaneously rush into both ends of the main cylinder and gradually absorb the momentum of the carriage in such a manner as gently to reduce its motion in opposite directions to a position of rest. In actual practice, there is a slight and gradually reduced to and fro movement of the carriage prior to complete arresting movement thereof. Of course, it does not make any difference at what particular position the carriage actually comes to a position of rest as obviously, the main object is to bring the racing carriage to a standstill, as the emergency has ceased as soon as the carriage is stopped. It will be noted that by reason of the fact that the lower ends of pipes 45 are at all times in open communication with steam at full pressure irrespective of the position of closures 24, that the latter can never interfere with an instant application of emergency steam. In other words, while I use the same steam or pressure fluid for emergency stoppage that I use for normal operation, which is the most important feature, still, by reason of the fact that the emergency valves are in following relation with respect to the main valves, the latter merely cease to function when the emergency valves are in a functioning adjustment. Consequently, in normal operation, my emergency valves do not in any way interfere or modify the function and operation of the main valves, and conversely, when my emergency valves are in a functioning adjustment the main valves are so wholly uneffective that they may be in any position without in any way effecting the operation of the emergency valves.

I will next describe the mechanism and the manner in which the emergency valves are operated.

Figures 5, 6, 7:
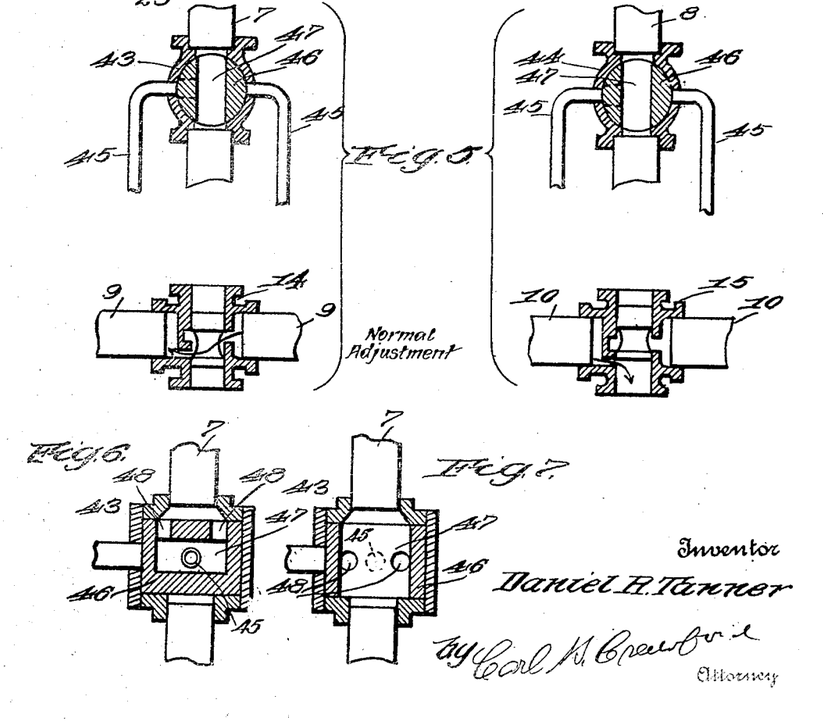
Figure 5 is a similar view showing the main and emergency valves in another position of adjustment.
Figure 6 is a sectional view on line 6—6 of Figure 4 of one of the emergency valves showing the same in one position of adjustment.
Figure 7 is a similar view showing the valve in a different position.
Figures 6, 9, 10, 13:
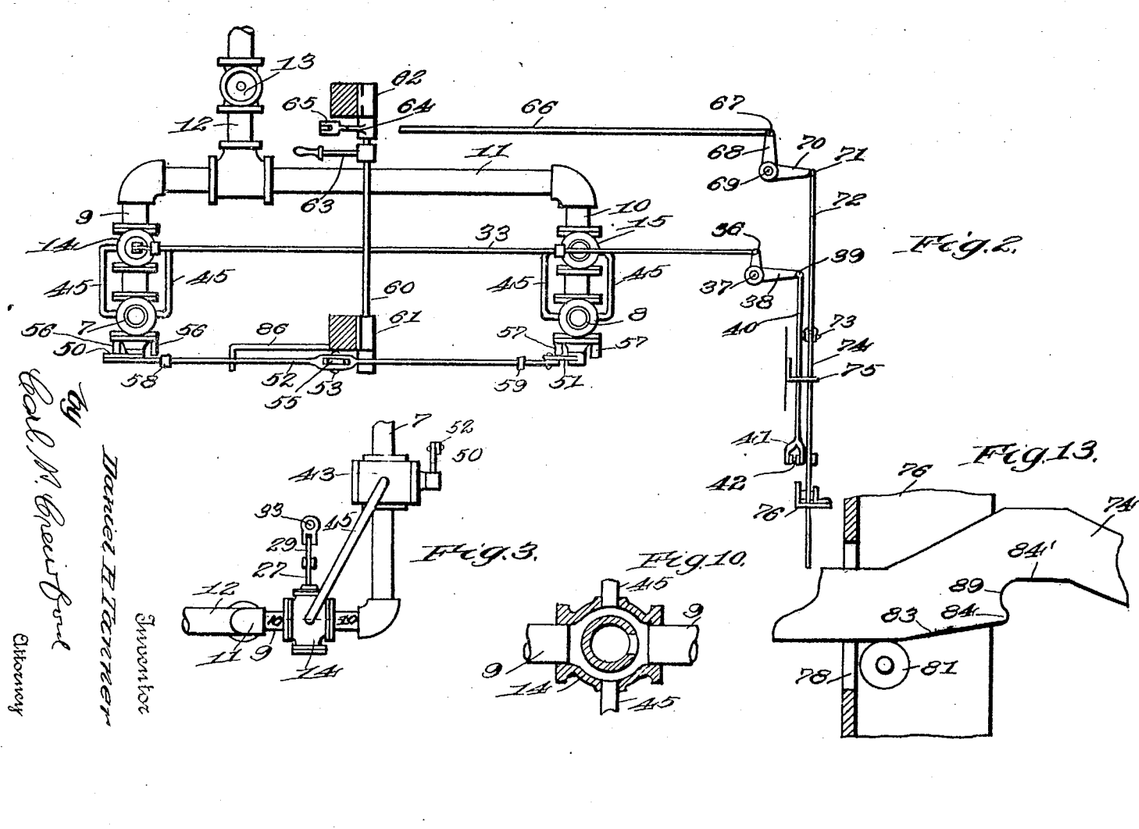
Figure 9 is a similar view showing the trip device released for an emergency application of steam.
Figure 10 is a sectional view on line 10—10 of Figure 3.
Figure 13 is a view similar to Figure 12 showing the trip bar in a released position.

The closures 46 have arms 50 and 51 which are pivoted at their ends to an operating rod 52. Said operating rod 52 has a pin 53 which projects into the slotted end 54 of an arm 55. The valves have stops 56 and 57 limiting movement of arms 50 and 51 in opposite directions so that in either extreme position of the closures 46, the latter will be in the full extreme position shown in Figures 4 and 5 for proper port registry. The excess play afforded by slot 54 permits of each arm going to a full extreme position. Independent adjustments 58 and 59 provide for leeway so that both arms 50 and 51 can reach their stops 56 and 57. Arm 55 is mounted upon a shaft 60 which is journaled in bearings 61 and 62. A hand-restoring lever 63 is mounted on said shaft. An arm 64, mounted on said shaft is pivoted at 65 to one end of the link rod 66, the remaining end of which is pivoted at 67 to one arm 68 of a bell crank lever. This lever is mounted upon a fixed pivot 69 and the other arm 70 is pivoted at 71 to a link 72. The remaining end of link 72 is pivoted at 73 to one end of a trip-bar 74. This trip-bar 74 is slidable in guides 75 and 76 having openings 77 and 78 therein. Bar 74 has an arcuate trip portion 79 which is struck from a radius of which the axis 80, of the control lever, is the center. A roller 81 is journaled at 82 abreast of the opening 78. The bar has a cam surface 83 which terminates in a retaining shoulder 84, adapted for engagement with roller 81 below the axis of rotation of the latter. The bar 74 has a supporting linear surface 84' which rests upon the roller 81 and locates the shoulder 84 below the axis of said roller. The bar 74 is cut away at 89 to localize the action of the shoulder 84 against the roller 81, below the axis thereof. When the bar 74 is tripped, it must be elevated until the shoulder 84 rises above the axis of said roller 81 whereupon the cam 83 will ride up on the roller 81 and elevate the bar as shown in Figure 9. The bar is of sufficient length so that even when the same is tripped, the left hand end will not pass entirely through the guide 76, as shown in Figure 9. One of the great advantages of the construction shown in Figures 11 to 13, is that any jar such as loading the logs on the carriage will not accidentally trip the bar 74. Likewise, if the carriage operator imparted a slight excess thrust of a pull or push nature to the controlling lever, he would not trip the bar 74 unless such thrust was sufficient to elevate the shoulder 84 above the axis of the roller 81. Thus the device is not susceptible of being accidentally tripped as the shoulder 84 will play back and down into the position shown in Figure 11 unless it is given the required elevation.

Before entering into a description of the controlling lever, it will be necessary to again refer to Figure 1 to describe the means for arresting the bar 74 after it has been released and also to describe the means for holding the bar 74 under normal stress so that when it is released it will instantly respond to requirements.

Figure 4:
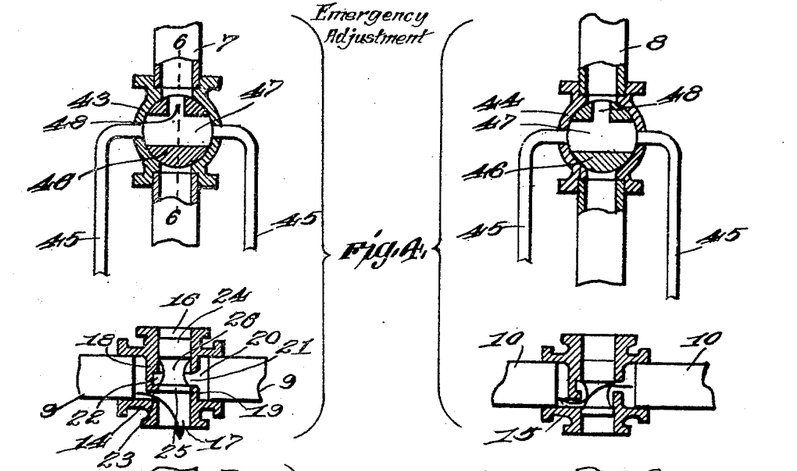
Figure 4 is a fragmentary sectional view of the main and emergency valves showing the same in one position of adjustment.

In the position shown in Figure 1 the device has been tripped and the emergency valves are in the position shown in Figure 4, which is their functioning position. A stop 85 limits movement of the arm 55. This stop is provided with an arm 86 to which one end of a spring 87 is connected. The other end of said spring is connected to arm 55. Thus it will be seen that the spring 87 always energizes the rod 52 to move into the emergency adjustment shown in Figure 1 and therefore moves the bar 74 from the retained position shown in Figure 8, to the advanced position shown in Figure 9, just as soon as the shoulder 84 has been released from roller 81. To restore the device from an emergency position back to normal operation, the lever 63 is raised in the direction of the arrow until the bar 74 has been moved from the position shown in Figure 9, back to the position shown in Figure 8. Of course the rod 52 and other connected parts are moved back accordingly.

I will next describe my improved controlling lever structure, reference being had more particularly to Figures 14 to 17.

Figures 14, 15, 16, 17:
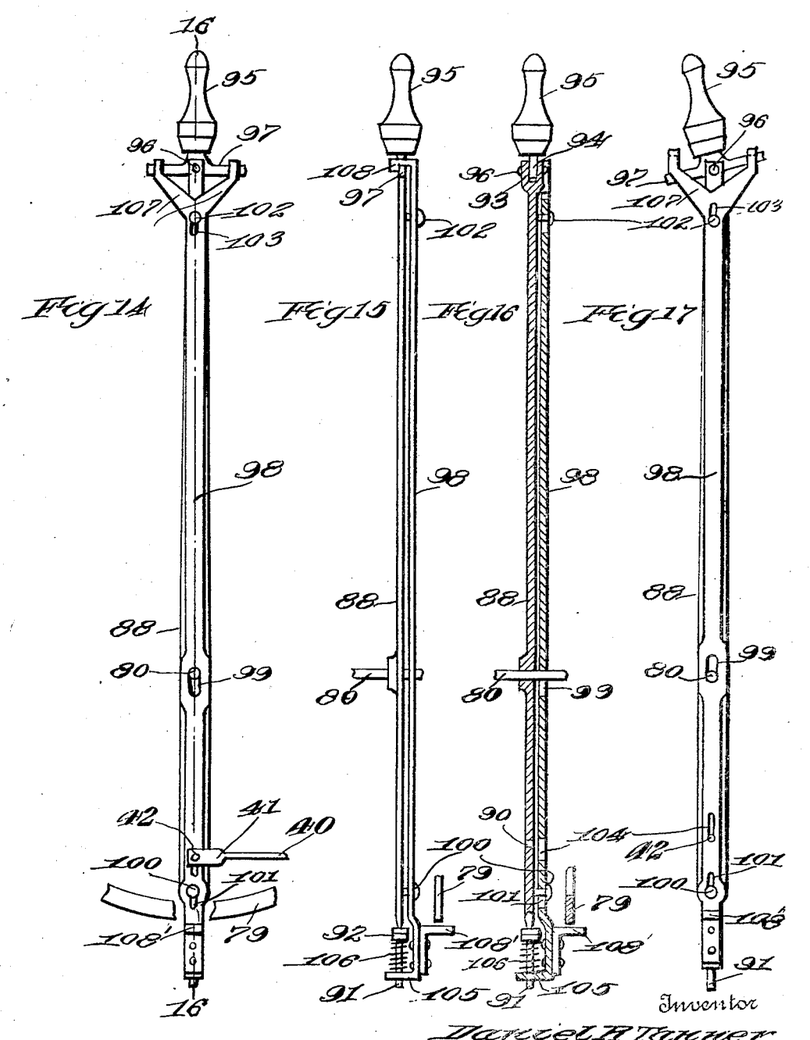
Figure 14 is a view on an enlarged scale in side elevation of the controlling lever.
Figure 15 is an edge view looking from the left of Figure 14.
Figure 16 is a sectional view on line 16—16 of Figure 14.
Figure 17 is a view similar to Figure 14 showing the position which the lever structure would assume when tripped or energized to release the trip device.

As shown, 88 designates the normal control lever which is mounted to swing about a fixed axis 80. The link 40 is forked at 41 and in lever 88 a hole 90 carries pivot 42. The lower end of said lever 88 is reduced at 91 and is threaded to take spring adjusting nuts 92, the purpose of which will later appear. The upper end of said lever is forked as indicated at 93 and the lower end 94 of a handle 95 is connected with the forked end 93 by a pivot 96. The handle 95 has oppositely projecting emergency fingers 97 as clearly shown. An emergency lever 98 is mounted on and slidable longitudinally along the main controlling lever and is provided with a slot 99 co-acting with the axis pivot 80. A stud 100 is fixed to lever 88 and extends through a slot 101 in the emergency lever 98. A stud 102 is fixed in lever 88 and extends through a slot 103 in lever 98. By this means, the emergency lever is substantially hung on the normal control lever and moves therewith during normal operation of the carriage. A slot 104 in the emergency lever accommodates pivot 42. The emergency lever has a foot 105 provided with a suitable aperture for projection therethrough of the reduced end 91. An expansively acting spring 106 surrounds the reduced end 91 and is interposed between the foot 105 and the nuts 92 to normally maintain the two levers 88 and 98 in the relative positions shown in Figures 14 to 16. The upper end of the emergency lever 98 is forked at 107 and the fork terminals 108 are bent over to slidably engage the fingers 97. The spring 106 functions to stabilize the handle 95 and hold the same in aligned relation with the levers as shown in Figure 14. This spring 106 is strong enough to thus function when the lever structure is rocked to and fro under normal manual thrust, or in other words, under such relatively light manual thrust as would be even more than sufficient to be applied to handle 95 under any ordinary operative requirements of a strictly normal nature. This applies either to a push or pull thrust. However, in the event of an emergency such as would require the carriage to be quickly brought to a position of rest, then a pull or push thrust on the handle 95 of a thrust or stress in excess of the normal would overcome the spring 106, thereby permitting the handle 95 to be rocked out of aligned relation with the levers thereby elevating the emergency lever 98 as far as the slot and stud connection will permit as shown in Fig. 17. It is desired at this point to emphasize the feature that this excess or abnormal thrust on the handle 95 will be exercised in the same plane of movement that is ordinarily imparted to the handle. Consequently under the stress of excitement, the carriage operator is not called upon to make a motion that he is not accustomed to make and he is not called upon to release his hand from the controlling lever. On the contrary, he is instantly ready to impart an abnormal and strenuous push or pull thrust on the handle 95 knowing full well that this is all that is necessary to bring the carriage to a position of rest.

I will next describe the manner in which the lever structure co-operates with the bar 74.

The emergency lever 98 has an emergency portion or lug 108' which projects beneath the arcuate portion 79 with a slight free clearance. With the levers in the normal position shown in Figure 14, and by reason of the fact that the axis 80 is the center from which the radius of portion 79 is struck, the lug 108' will always normally be in free working clearance from said portion 79 irrespective of the position of the levers. Furthermore, and far more important, the lug 108' will always be in such close proximity to the portion 79 that it will be in readiness to always act irrespective of the position of the levers. Therefore, just as soon as the handle 95 is rocked to the position shown in Figure 17, the shoulder 84 of bar 74 will be lifted above the axis of roller 81 and the spring 87 will instantly shift the bar 74 and its connected parts, including arms 50 and 51, to the position shown in Figure 1. This will throw the mechanism into an emergency adjustment with the emergency valves in the position shown in Figure 4, as hereinbefore described. Now the importance of the slot 54 will be clear since it is absolutely necessary that the emergency valves should be in either extreme position, it will now be understood that when the valves are suddenly thrust over and with the stop 85 limiting movement of the arm 55, the momentum will serve to give a full throw to the valves. Furthermore, it will now be clear that the carriage man standing by the lever 88 is powerless to again restore the mechanism to a normal position of operation since any movement of either lever 88 or 98 would be fruitless. All he can do is to move the main valve closures but they are functionless because of the position of the emergency valves. Hence it is necessary to send a man to a position below the carriage floor 1 to pull up on lever 63 and restore the emergency valves to the position shown in Figure 5 and restore, thereby, the trip bar 74 to the position shown in Figure 8. The operator in practice, who lifts the lever 63 will notify the carriage man that he is going to perform this function and of course the carriage man will instantly shift the main control lever to the neutral position shown in Figure 8 so that after the mechanism has been restored the carriage cannot again start to move until the control lever is actuated. The importance of elevating the bar 74 by means of the cam 83 will now be clear since it permits of any movement of the lever, as shown in Figure 9, without the lug 108' interfering with the arcuate portion 79.

The device of my invention has been in actual operation in a saw mill and was successfully operated prior to the preparation of this application and hence all of the advantages alleged are based upon successful operation.

It is believed that my improved apparatus will be fully understood from the foregoing, and I do not wish to be limited by the disclosure made except for such limitations as the claims may import.

I claim:—

1. In combination, a saw mill carriage, pressure fluid mechanism having main valves for causing reciprocation of said carriage and emergency valves for arresting movement of said carriage, a lever operatively connected with said main valves, trip means normally holding said emergency valves inactive and including a trip bar provided with an arcuate portion struck on a radius of the swinging axis of said lever, and said lever having means for releasing said bar including a lug traversing said arcuate portion and adapted to engage and trip said bar in any position of said lever.

2. In combination, a saw mill carriage, pressure fluid mechanism having main valves for causing reciprocation of said carriage and emergency valves for arresting said carriage, a spring actuated trip device for holding said emergency valves inactive and including a trip bar, a main lever movable about a fixed axis and connected with said main valves and having a pivoted handle, a trip lever carried by said main lever and slidable thereon longitudinally thereof and being connected with said pivoted handle and having a lug for engagement with said bar, a spring normally holding said trip lever inactive and stabilizing said handle under normal manual stress thereon but yielding under abnormal manual stress, whereby rocking movement of said handle will actuate said trip lever to cause said lug to trip said bar.

3. In a combined normal and emergency lever mechanism, a normal lever mounted to swing about a fixed axis and having a pivotally mounted handle, an emergency lever mounted on and slidable longitudinally along said normal lever and connected with said pivoted handle and having an emergency acting portion, and a spring connected with said levers to hold the same in normal relative positions under normal stress applied to said handle and yielding under abnormal stress on said handle for movement of said emergency lever into an emergency position.

4. In a combined normal and emergency lever mechanism, a normal lever pivoted to swing about a fixed axis and having a handle pivoted to swing in the plane of movement of said lever, said handle having oppositely projecting emergency fingers, an emergency lever mounted on and slidable along said normal lever and having forked portions engaging said fingers and provided with an emergency acting portion, and a spring connecting said levers and normally stressing said emergency lever to hold said handle in alinement with said normal lever but yielding under abnormal manual stress to permit said handle to tilt and shift said emergency lever into an emergency position.

5. In combination, a saw mill carriage, pressure fluid mechanism having main valves for causing reciprocation of said carriage and emergency valves for arresting movement of said carriage, a lever operatively connected with said main valves, trip means normally holding said emergency valves inactive and including a trip bar having a retaining shoulder, a roller for engagement by said shoulder, and said lever having means engaging said bar to elevate said shoulder above the axis of said roller to release said bar.

6. In combination, a saw mill carriage, pressure fluid mechanism having main valves for causing reciprocation of said carriage and emergency valves for arresting movement of said carriage, a lever operatively connected with said main valves, trip means normally holding said emergency valves inactive and including a trip bar having a retaining shoulder, a roller for engagement with or by said shoulder, and said bar having a supporting edge engaging the top of said roller to retain said shoulder in a predetermined position with respect to said roller, and said lever having means engaging said bar to elevate said shoulder above the axis of said roller to release said bar.

7. In a combined normal and emergency lever mechanism, a normal lever mounted to swing about a fixed axis, an emergency lever movably carried by said normal lever, a spring for holding said levers in normal relative position, handle means for operating said normal lever, and mechanism whereby abnormal stress applied to said handle means will overcome said spring and actuate said emergency lever.

8. In a combined normal and emergency lever mechanism, a normal lever mounted to swing about a fixed axis, an emergency lever carried by said normal lever and movable longitudinally thereof and connected to swing with said normal lever, a spring for normally exercising longitudinal thrust to hold said levers in a normal relative position, handle means for operating said normal lever, and mechanism whereby abnormal stress applied to said handle means will overcome said spring and impart longitudinal movement to said emergency lever.

9. In combination, a saw mill carriage, pressure fluid mechanism having main valves for causing reciprocation of said carriage and emergency valves for arresting movement of said carriage, combined normal and emergency levers mounted to swing in unison about a fixed axis and said emergency lever being movable relatively to said normal lever and said normal lever being connected to operate said main valves, a trip bar structure normally holding said emergency valves inactive and having an arcuate portion of which said fixed axis is the center when said bar structure is inoperative, and means whereby emergency actuation of said emergency lever will engage said arcuate portion to cause operation of said bar structure.

In testimony that I claim the foregoing as my own, I hereby affix my signature.

DANIEL R. TANNER.